C. HELTSLEY.
CHECK PROTECTOR.
APPLICATION FILED APR. 14, 1915.
1,175,058.
Patented Mar. 14, 1916.
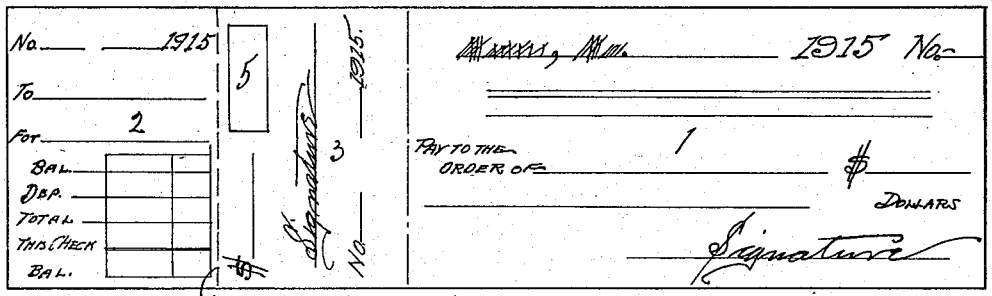
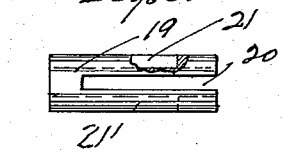
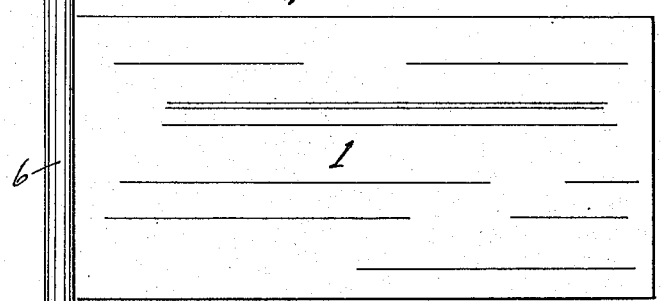
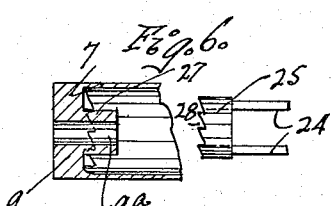
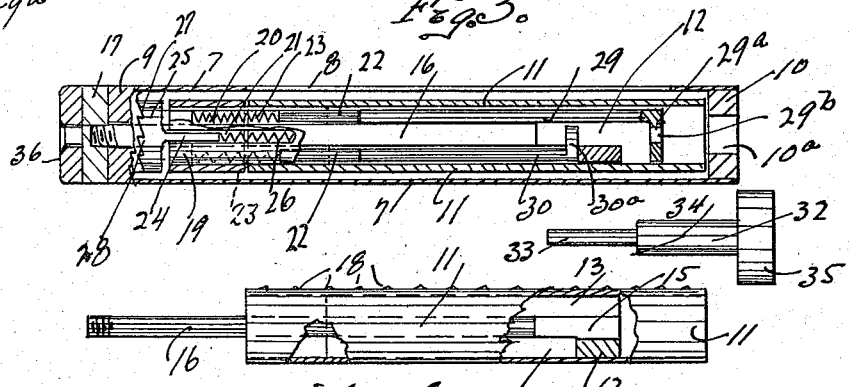
WITNESSES:
Frank H. Fowler.
Winifred Knoph
INVENTOR
Charles Heltsley
BY
Fred P. Lorie
ATTORNEY

UNITED STATES PATENT OFFICE.

CHARLES HELTSLEY, OF SEATTLE, WASHINGTON.

CHECK-PROTECTOR.

1,175,058.  Specification of Letters Patent.  Patented Mar. 14, 1916.

Application filed April 14, 1915. Serial No. 21,279.

*To all whom it may concern:*

Be it known that I, CHARLES HELTSLEY, a citizen of the United States, and a resident of Seattle, in the county of King and State of Washington, have invented certain new and useful Improvements in Check-Protectors, of which the following is a full, true, and exact specification.

My invention relates to check protectors and has for its principal objects to provide a bank check in which there is an intermediate stub between the usual stub and check, the intermediate stub having places for the signature of the maker of the check, the amount and a private mark of the maker known only to the maker and the bank.

A further object is to provide a check lock which is compact and novel in design, and which is adapted to be attached to the intermediate stub and to conceal it entirely from view after the check and said intermediate stub have been detached from the usual stub. The check and intermediate stub with the lock attached, are given in payment the same as an ordinary check. When the check reaches the bank, the cashier looks at the signature on the check, gets the key which will open the lock of that particular depositor, opens and removes the lock, compares the signatures and amounts on the check and on the intermediate stub and also compares the depositor's private mark on the intermediate stub with that on file with the bank. It will be seen that additional safeguards are added to the usual form of check by my improved form of check and check lock.

Other objects will appear as my invention is more fully explained in the following specification, illustrated in the accompanying drawings and pointed out in the appended claims:

In the drawings, Figure 1 is a plan of my improved form of check. Fig. 2 is a plan of my check lock and check shown in the form in which it reaches a bank. Fig. 3 is a central longitudinal section of the check lock. Figs. 4, 5 and 6 are views of details of the check lock shown separately.

In the drawings, numeral 1 designates a check, 2 a stub and 3 an intermediate stub between the check and the stub. The stub is detachable from the check and intermediate stub along the perforated line 4. Both the check and the stub are usual as to form but the intermediate stub 3 is new. There are places on the intermediate stub for the date, No., amount of check, signature, and a place 5 for the maker's private mark or pass sign at the bank without which the bank would not honor the check.

The check and intermediate stub are torn from the stub as usual when filled out and the free end of the intermediate stub is inserted in the lock 6, which as shown is cylindrical and rolled up within the said lock until only the check proper remains in view as shown in Fig. 2. The check is now in proper form for being mailed or cashed as previously described.

The lock 6 is composed of an outer cylinder 7 having a slot as at 8, and being provided with ends 9 and 10 which are secured to the said cylinder. Both heads 9 and 10 are provided with a central opening as at $9^a$ and $10^a$ respectively. Within cylinder 7 is an inner cylinder 11 somewhat smaller in diameter than cylinder 7, and open at both ends. Within cylinder 11 and secured thereto is a tumbler block 12 having longitudinal slot 13 the full length of it and a similar slot 14 oppositely disposed but not running the full length of the block. The tumbler block is also centrally bored as at 15, and is provided with an operating rod 16 which is secured to the said block. The operating rod 16 is adapted to pass through the opening in end 9 and to receive a thumb nut 17 by which the inner cylinder 11 is rotated from without the outer cylinder. The inner cylinder 11 is provided with a row of teeth 18 for catching the end of the intermediate stub 3 when it has been inserted in the slot 8 in the outer cylinder 7.

It will be understood that the intermediate stub is rolled upon the outside of the inner cylinder and within the outer cylinder. A cylindrical cage 19 having longitudinal slots as at 20 and 21 arranged in oppositely disposed pairs and cut in from opposite ends of the cage 19, is adapted to fit over rod 16 and to project partly within the end of the inner cylinder 11. The slots 20 line up with the slots 13 and 14 in the tumbler block and are adapted to receive tumblers 22 and springs 23. The slots 21 are adapted to receive fingers 24 of a circular ratchet 25 and springs 26. A sleeve 27 partially surrounds the cage 19 and assists in maintaining the springs 23 and 26 and the forks 24 in proper alinement. The end 9 is provided with a boss $9^a$ and ratchet teeth 27 which coöperate with similar teeth 28 on the ratchet 25. The boss 9ª fits within the circular ratchet 25. The springs 26 hold the ratchet teeth 25 normally in engagement with the teeth 27. Plungers 29 and 30 are adapted to fit within slots 13 and 14 respectively in block 12 and bear against the tumblers 22. The plunger 29 has an offset circular head 29ª which has a centrally located opening 29ᵇ. Plunger 30 has a solid offset circular head 30ª which normally bears against the top of slot 14. The springs 23 normally hold the tumblers 22 as shown in Fig. 3, that is partly within the slots 20 in the cage 19 and partly within the slots 13 and 14, which securely locks the gate 19 and the inner cylinder 11 together so far as rotation is concerned, and the ratchet teeth 27 prevent the cage 19 from rotating in more than one direction, therefore when the tumblers are in the positions shown in Fig. 3, the lock will freely wind the intermediate stub about the inner cylinder 11 as previously explained, but will prevent the withdrawal or unwinding of the stub from the lock. A key 32 having a shouldered portion 33 is provided for unlocking the lock. The key is inserted in the opening 10ª in end 10 and when inserted as far as possible, the portion 33 and the shoulder 34 have pushed inwardly the plungers 30 and 29 respectively, until their inner ends are in the plane of the inner end of the cage 19 at which time the tumblers 22 are forced back entirely within the slots in the cage. When the key is in the lock as just described, it is possible to place a finger upon the outer end 35 of the key and the thumb upon a loose swivel nut 36 on the other end of the lock and with the other hand, withdraw the rolled intermediate stub from about the cylinder 11 which is no longer held to the cage 19 by the tumblers 22. The lock as shown has only two tumblers and plungers, but it is obvious that more might be added.

While I have shown a particular form of embodiment of my invention, I am aware that many minor changes therein, will readily suggest themselves to others skilled in the art without departing from the spirit and scope of the invention, and I therefore, desire to avoid being limited to the exact form shown and described.

What I claim as new and desire to protect by Letters Patent, is—

1. In a check protecting device, the combination of a locking means within which an identifying portion of the check may be locked from view, and means for releasing the said locking means from the said check, the said locking means including an outer and an inner casing having a space between the said inner and outer casing for placing the said portion of the check, means within the said outer casing for securely locking the said inner casing with respect to the said outer casing, the said releasing means including a key adapted to unlock the inner casing from the outer casing and to release the said portion of the check.

2. In a check protecting device, the combination of a locking means within which an identifying portion of the check may be locked from view, and means for releasing the said locking means from the said check, the said locking means including concentric outer and inner casings having an annular space between and a slot in the outer casing adapted to receive the said check portion, means on the inner casing for positively gripping the inserted check portion between the inner and outer casings, means within the outer casing for securely locking the inner casing against retrograde movement other than rotation in one direction with respect to the outer casing, said means including coöperating ratchets, one of which is integral with the said outer casing a slotted cage which holds the other against independent rotation and springs which hold the ratchets in engagement, a slotted tumbler block secured within the inner casing, tumblers adapted to be normally spring held partly within the slots in the tumbler block and partly within slots in the cage, whereby the said cage and the tumbler block are severally held together and whereby the inner casing is normally held against independent rotation with respect to the last mentioned ratchet, means for rotating the inner casing with respect to the outer casing in one direction, and means for releasing the said check locking means, said releasing means including plungers within the slots in the tumbler block and acting against the ends of the tumblers, a key which is adapted to act against the outer ends of the said plungers and thereby force the tumblers back within the cage and release the engagement of the said cage with the inner cylinder casing, whereby the inner cylinder is free to rotate in either direction and the retained portion of the check is released.

CHARLES HELTSLEY.

Witnesses:
 FRANK H. FOWLER,
 WINIFRED KNAPH.